Patented Apr. 22, 1930

1,755,677

UNITED STATES PATENT OFFICE

SABURO URANO, OF TAKATACHO, NEAR TOKYO, AND SEICHIRO IMAI, OF OKUCHO, NEAR TOKYO, JAPAN

PROCESS OF MANUFACTURING BASIC CALCIUM HYPOCHLORITES

No Drawing.   Application filed March 15, 1926.   Serial No. 94,941.

The present invention relates to the process of manufacturing basic calcium hypochlorites in almost pure state from the solution of ordinary bleaching powder or the equivalents in the following process:

First to evaporate the mixed solution of calcium hypochlorites, calcium chloride and slaked lime such as milk of lime absorbed with chlorine or aqueous solution of bleaching powder or the like to a certain concentration so as to unite the calcium hypochlorite with slaked lime and the basic calcium hypochlorites thus produced are crystallized and dried under vacuum.

The object of the present invention is to economically produce basic calcium hypochlorites containing available chlorine in the most stable condition by eliminating unavailable calcium chloride from an ordinary bleaching powder which consists of calcium hypochlorite and slaked lime thus the higher contents of available chlorine and non-hygroscopic products will be obtained.

The practical process in manufacturing the products is as follows:

The mixture of solid slaked lime and equeous solution of an ordinary bleaching powder which usually contains calcium hypochlorite and calcium chloride is evaporated under vacuum at a temperature of 40 degrees centigrade. The solid lime, though it is very slightly dissolved, combines with the calcium hypochlorite in the solution and precipitates the basic hypochlorite and induces the solid lime to dissolve more and forms more basic salt in turn till all the lime combines to calcium hypochlorite. The necessary proportion of the slaked lime and the bleach liquor can easily be determined by analysis of the mixture (the solid lime and the liquid) also by microspic research as the basic salts have their own special crystalline forms.

The dibasic salt is so stable at a certain condition of liquid phase that it can be washed by water and the mother liquor can easily be removed. An excess of water can be eliminated in vacuum and the salt is manufactured.

The monobasic salt is also obtained in the same way at a certain condition of liquid phase.

Having thus described our invention, we claim:

A process for making stable bleaching powder, which consists in evaporating the solution of the bleaching powder under vacuum at temperature 40 degrees C., crystallizing out dibasic calcium hypochlorite, owing to the combination of calcium hydroxide, with calcium hypochlorite leaving calcium chloride in the solution.

In testimony whereof we affix our signatures.

SABURO URANO.
SEICHIRO IMAI.